Aug. 22, 1944.   H. A. DEUEL, JR., ET AL   2,356,660
METHOD AND APPARATUS FOR DETERMINING THE AVERAGE THICKNESS
OF THE ENTIRE WIDTH OF COILED METALLIC STRIP
MATERIALS FROM ROLLING MILLS
Filed June 13, 1942   4 Sheets-Sheet 1
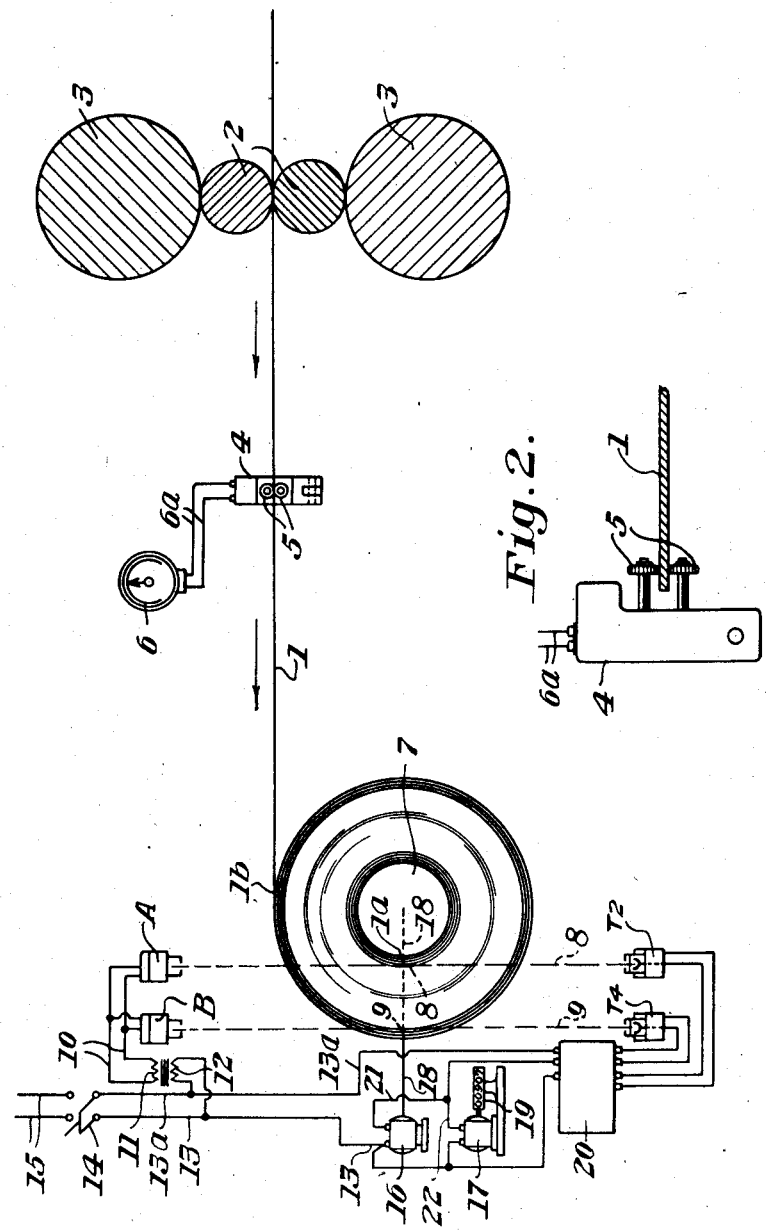
INVENTORS
HARRY A. DEUEL, JR.,
and GEORGE H. KRAPF,
by: John E. Jackson
their Attorney.

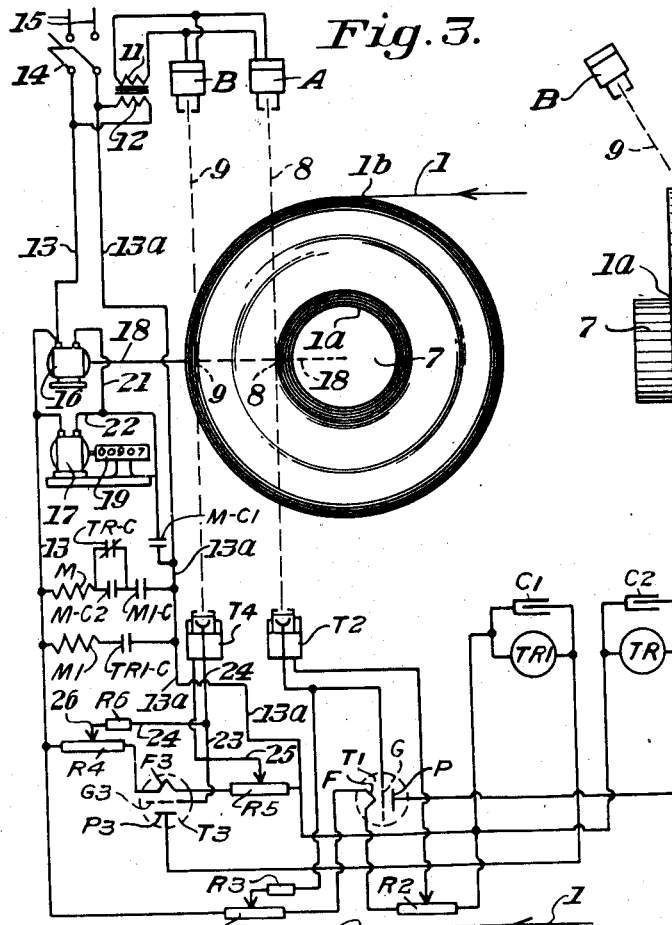

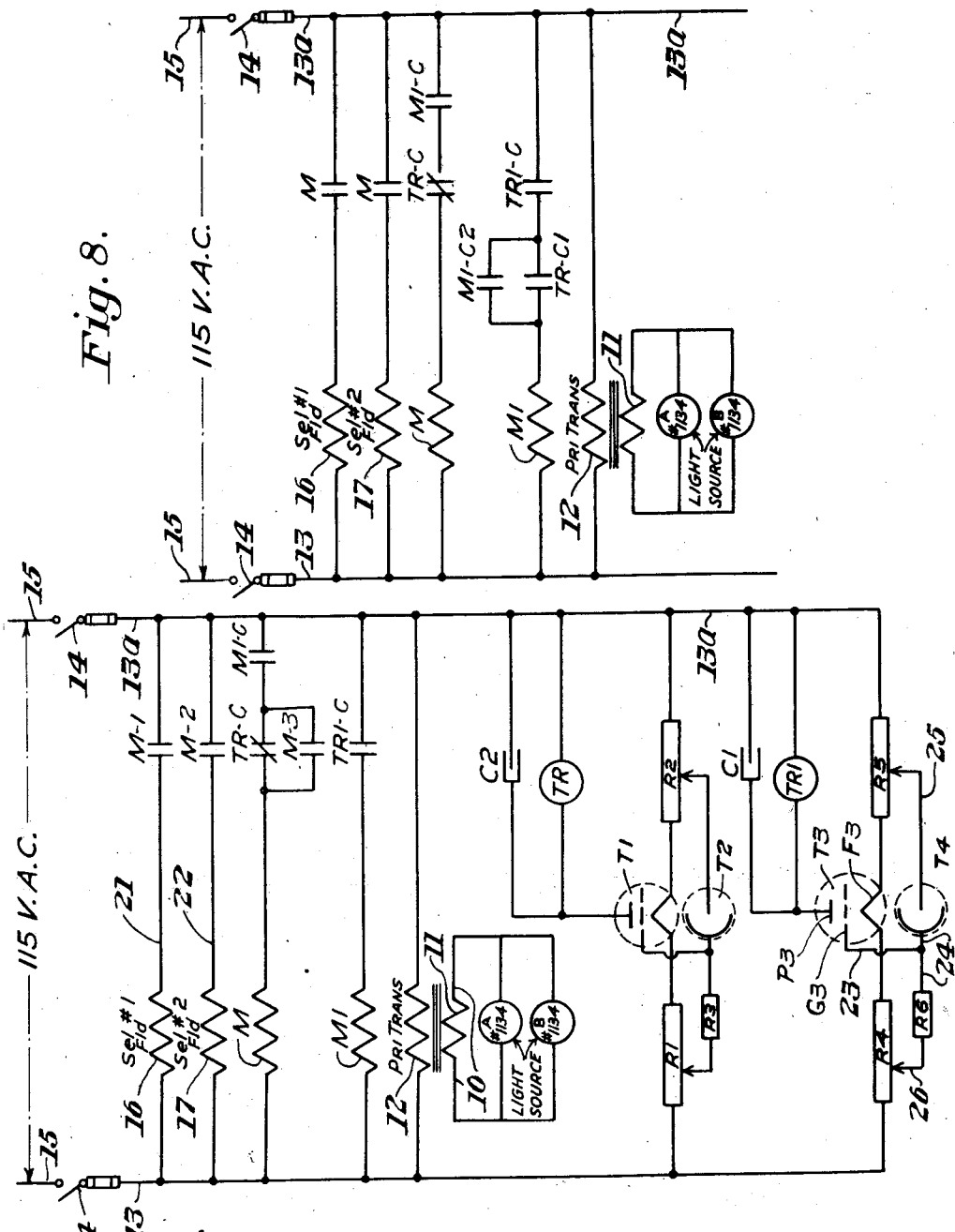

Aug. 22, 1944.   H. A. DEUEL, JR., ET AL   2,356,660
METHOD AND APPARATUS FOR DETERMINING THE AVERAGE THICKNESS
OF THE ENTIRE WIDTH OF COILED METALLIC STRIP
MATERIALS FROM ROLLING MILLS
Filed June 13, 1942   4 Sheets-Sheet 4

INVENTORS
HARRY A. DEUEL, JR.,
and GEORGE H. KRAPF,
by John E. Jackson
their Attorney.

Patented Aug. 22, 1944

2,356,660

UNITED STATES PATENT OFFICE 2,356,660

METHOD AND APPARATUS FOR DETERMINING THE AVERAGE THICKNESS OF THE ENTIRE WIDTH OF COILED METALLIC STRIP MATERIAL FROM ROLLING MILLS

Harry A. Deuel, Jr., Huntington, Ind., and George H. Krapf, Clairton, Pa.

Application June 13, 1942, Serial No. 446,964

15 Claims. (Cl. 33—125)

This invention relates generally to a method and means for determining the average thickness throughout the entire width of coiled strip material, and more particularly relates to metal strip material such as steel strip material which is formed on rolling mills and coiled on reels after the strip material has left the rolls of the rolling mill.

In the rolling of the metallic stock, such for example as strip steel or the like, it has presented a problem to gage or measure the thickness of the material during the process of rolling, and more particularly to obtain some means of gaging or determining the thickness throughout the entire width of the traveling strip material. As a matter of fact, up to the present time, there has not been known or utilized in practical commercial rolling operation any method or means whereby the thickness of the traveling strip material throughout its entire width, or even of the average thickness, may be obtained. There has been known and utilized in practical rolling operation a means and method of obtaining an indication of the thickness of the traveling material at one particular zone or portion of the width of the traveling strip material after it has passed through the rolls of the rolling mill. The means employed for obtaining an indication of the thickness of the traveling strip at one particular limited portion or zone of the width of the strip has been by employing what has been referred to as a flying micrometer. This instrument is mounted adjacent one edge of the traveling strip material and comprises a plurality of rollers or gaging members between which a comparatively narrow zone or portion of the width of the strip passes. Suitable mechanism is associated with the gaging wheels so that upon variation of the thickness of the material a movement is obtained which varies the potential characteristics of an electric circuit which variation, in turn, is reflected or indicated in the movable dial of an instrument. However, such an instrument is extremely sensitive and is likely to be effected by a movement or vibration of the traveling strip at high speeds, which movement may cause a change in the reading of the flying micrometer instrument, which would not truly represent a variation in the thickness of the traveling strip material, even at the restricted zone of its width which is being gaged or measured. Of course, it would hardly be practicable to provide a series of gaging wheels and a plurality of flying micrometer indicating dials to indicate the thickness throughout the entire width of the traveling strip. Such an arrangement would be complicated and costly, if not practically impossible, because of the difficulty of transmitting movement from gaging rolls on opposite sides of the strip at the central portion thereof to the electrical instrument.

One of the practical advantages in providing a method and means for determining the average thickness throughout the entire width of traveling strip material on rolling mills, at a time in the rolling operation immediately after the material has passed through the rolls (which may be any one of the series of rolling operations, either for purposes of reducing or finishing), is that it serves as a positive check upon the flying micrometer. It also affords an opportunity to make any necessary corrections in the roll adjustments, either as to the parallelism of their axes or the pressures thereon, or to make other necessary adjustments before continuing with further rolling operations in the event that the average thickness of the traveling strip material throughout its entire width is either more or less than a value permitted by the allowable tolerances.

Considering further the limitations of gaging traveling strip material by the instrument known as the flying micrometer, it might be noted that such instrument merely measures a very limited portion of the width of the strip as the gaging wheels are located approximately one-half inch from the edge of the strip. The vibration or movement of the strip at high speed causing a false or misleading indication on the instrument is sometimes referred to as a high frequency flutter. Another factor encountered even in cold rolling operations is the effect of the heat which is generated in the rolling action, which heat at times may vary from 250° to 350° F., as the temperature of the cold rolled strip. This heat is transmitted through the gaging rolls and various mechanism in such a way as to introduce slight inaccuracies in the meter reading.

Of course, from a practical and economic standpoint, it is a matter of considerable importance to be able to know definitely what the average thickness of the traveling strip is throughout its entire width. This is important from the standpoint of being able to meet specifications and to provide strip material of thicknesses which are within the permissible tolerances, in order to avoid losses due to rejections and return of material. Further, even though the matter of keeping within certain narrow tolerances, as to width of the strip, may not be the important factor, from the standpoint of economy in operation it is important to know that in the continuous rolling process the thickness of the material is not greatly in excess of that which is required because it may mean that the increase in the thickness of the stock would represent a loss, as such material would not be paid for where the material is sold to specifications involving a certain length and not less than a certain thickness.

To give an idea of how fine an adjustment of the rolls must be made at certain times in the rolling operation, it might be noted that an adjustment of 0.0001 or 0.0002 inch in the thickness of the traveling strip metal stock is all that is required in order to cause the material to either comply with or vary from tolerances permitted in what is known as the package weight. Within any one coil of material the thickness may vary as much as 0.0005 inch, plus or minus. Some standards, however, require that the material check within one per cent. Considered on the basis of carload lot some requirements require that the material must check within two per cent. On any one individual strip a tolerance of four per cent, plus or minus, in strip thickness is sometimes permitted. However, such a tolerance might represent a variation, plus or minus, of one or two ten thousandths of an inch.

To give an indication of conditions to be encountered in practical cold rolling operations, it might be stated that strip material may vary in width from 28 to 42 inches and may vary in speed from 1800 to 3000 feet per minute.

In view of the difficulties encountered in the employment of the flying micrometer and the various factors which may serve as a source of error in the indication and reading of the flying micrometer, the present subject matter of invention, including the method and the various types of apparatus by which the method may be practiced, may be used as a means of verification or a check upon the indications of the flying micrometer, but it is understood that the present invention may be independently employed as a means of obtaining the average thickness throughout the entire width of a traveling strip when coiled on a reel.

In general the process and apparatus determines the number of turns or revolutions of a winding reel that are required to build up a given or predetermined radial distance or thickness of coiled strip material on the reel, and the average thickness throughout the entire width of one layer of the coiled strip is derived or determined by the quotient or number obtained by dividing the given or predetermined radial thickness of the coiled strip by the number of turns or revolutions of the winding reel. Such average thickness throughout the entire width of the traveling strip may be expressed in formula form as follows:

$$T_a = \frac{R_t}{N_t}$$

in which $T_a$ equals the average thickness throughout the entire width of the strip, $R_t$ equals the radial thickness of the strip material coiled on the reel for a determined number of revolutions of the reel, and, $N_t$ equals the number of revolutions of the reel required to build up a predetermined radial thickness of coiled strip.

Of course, in practical operation, it is desirable to obtain a simultaneous or coincident starting and stopping of the revolution counting means, with the starting and ending points of the radially extending distance representing a predetermined distance in which a determined or known number of revolutions are required in order to build up the coiled strip material to the predetermined radial distance. It is preferable that the beginning of the radial distance be at a point after the end of the strip material has been secured or fastened by suitable means upon the reel, and the reel rotated a few revolutions in order to properly secure the strip to the reel and get it started thereon under proper tension. It is preferable also that the end point of the radially extending distance representing a given thickness of coiled strip material on the reel be at a point before reaching the full winding capacity or load of the coiled strip material to be wound upon the reel. Such requirements as those above mentioned introduce a problem of synchronizing the starting and stopping of the revolution counting mechanism, with the starting and finish of the radial extending distance upon the reel upon which the strip material is wound. This synchronization at the two points should preferably be done without unduly interfering with the normal winding operation and preferably without causing unnecessary starting and stopping of the reeling material, after the reeling operation has once been started. The starting and stopping of the reel to effect the synchronization of the two points above noted would slow down the production of the rolling mill process.

In carrying out the method, such method may be practiced by effecting synchronization at the two points by hand manipulation of various mechanism to insure the starting and stopping of the revolution counting mechanism at the beginning and ending of the given or predetermined radial distance. For the purpose of practicing the method by hand operation, a marker of any suitable type, such as a piece of the strip material, may be inserted between two successive layers of the strip material as they are wound upon the reel, and may be employed to indicate the beginning of the radial distance and at the same time a suitable revolution counting mechanism may be started; such conditions may be continued until the strip has been coiled upon the reel to a thickness corresponding with the end of the predetermined radial distance, at which point the revolution counting mechanism would be disconnected or disengaged by manual means from the rotating reel, or from some other member having definite relation with the rotation of the winding reel for the strip material.

As a means of manually starting the revolution counting device at the proper point, various means may be employed, all of which may be dependent upon the voluntary act of one or more operations. Instead of directly manually connecting a revolution counting device with the rotating reel, an electrical impulse counter may be connected to the delivery reel drive. Such a counter registers the revolutions of the reel and may be started and stopped by the operator through an electrical circuit. The operator may insert a marker in the coil after the first several wraps around the reel and the electrical revolution counter may be started by manual means, simultaneously with the insertion of the marker. After most of the coil has been processed by winding upon the reel, the revolution counter is stopped manually by opening the circuit of the electrical impulse counter and at the same time a second marker is manually placed in the coil to indicate the end or finish or the radial distance. Where the markers are inserted by hand at the beginning and ending of the radial distance, the number of revolutions required in order to build up a radial distance between two markers is obtained by the number of wraps or revolutions indicated on the counter. With such a manual method of practicing certain steps of the method, the radial distance may vary somewhat from one reel to the other, but this will be without effect in considering the ultimate result in determining the average thickness of the strip throughout its entire width, provided there has been substantial synchronization by suitable automatic synchronous control means between the starting and stopping of the counting, and the beginning and ending of the radial distance on the reel, as representing the determined number of revolutions.

However, the method or process may be practiced automatically by the employment of various mechanical and/or electrical synchronous control means and apparatus for effecting the necessary synchronization above referred to without the necessity for intervention of one or more operators. Of course, in the employment of mechanical or electrical means it becomes necessary that the operations be performed in a certain sequence, and it is preferable that such sequence of steps of the process be entirely automatic without requiring the attention of the operator. In the employment of the mechanical and/or electrical means for automatically performing the various steps of the process, the radial distance is preferably arranged so as to be substantially at a determined or fixed distance, capable, however, of certain variations and adjustments to suit the particular conditions.

Various means will be hereinafter shown and described for automatically performing the sequence of steps for the successful practicing of the method. One of the features which is common to them all is one involving an electrical means of control for readily effecting synchronization of the revolution counting mechanism with the start and finish of points corresponding to a given or determined radial distance of coiled strip material on the reel, and corresponding with a given number of revolutions of the reel as determined from and indicated by the revolution counting mechanism synchronized with the start and finish of the given radial distance. Of course, if the number of revolutions corresponding to a given radial distance is in error, that is, if there has not been the proper synchronization of the starting and stopping of the revolution counting means with the start and finish of the given radial distance, there will be a slight error in the derived average thickness of the strip. This matter will be more fully referred to hereinafter. It will be pointed out that a slight tolerance for such an error may be permitted. The average thickness throughout the entire width of the strip, when obtained in the manner herein set forth, will be more accurate and dependable even than the flying micrometer indication of strip thickness. It will appear that it would require an appreciable error in the number of revolutions of the reel in order to amount to an error of one per cent. A lack of synchronization of the points above referred to, involving an error of but a few revolutions, would represent a derived error in the thickness of the material of the order of tens of thousands inches (or 0.00001 or more inches).

Another feature which contributes toward the simplification of the control and synchronizing operations, and which enables a simplification in arrangement and the avoidance of mechanical actuating and clutching elements in effecting the engagement and disengagement of the revolution counting means with the strip coiling reel, without interferring with the continuous rotation thereof, is an electrical unit comprising a plurality of members which may be situated at distant points and having a synchronous torque characteristic, which may be readily controlled through one or more pairs of contacts and control relays therefor. A motor commonly known as a Selsyn synchronous torque type motor control has such a characteristic and has been found satisfactory. Such a control includes two units, each of which may be located at points distant from each other. The system of control is designated as a synchronous torque type because of the characteristic that if one of the units is rotated at a given speed, the other unit will be rotated at substantially the synchronous speed at which the first unit is rotated. This is accomplished electrically through a suitable design and connections.

As specifically applied to the problem involved in the present invention, one of the units may be permanently mechanically connected to, and driven by, the reel upon which the coiled strip of material is wound, and the second unit may be permanently mechanically connected to the revolution counting means. The torque characteristics and electrical connections are such that the second unit will be driven and rotated in synchronism with the first unit, which is mechanically driven in synchronism with the strip coiling reel. Of course, while there may be a positive and permanent mechanical connection between the first unit and the strip coiling reel, and a permanent mechanical connection between the second unit and the revolution counting means, there will be no movement of the second unit which drives the revolution counter, unless the two units are energized by being connected across the line supplying current to the system.

A second feature, which is of some importance in contributing toward the proper synchronization of the starting and stopping of the revolution counting means with the beginning and ending of a determined radial thickness of the coiled strip on the reel, is the means whereby the control is effected of the synchronous torque units, such as the Selsyn motor control unit which controls the revolution counting means. A number of modified forms of control are disclosed herein for effecting automatically the necessary sequence of operations when the surface of the coiled strip on the reel has reached position corresponding to the beginning and end of the predetermined radial distance. In one such control system, mechanical elements for actuation of control contacts have been entirely eliminated, and electro-magnetic control is effected through the employment of the photo-electric cell control, wherein a plurality of light beams are employed at points or planes corresponding to the beginning and ending of the predetermined radial distance or thickness of the strip material which is coiled upon the reel.

Other modified forms of the control system for the torque synchronizing units include movable mechanical feeler elements so arranged and disposed as to effect circuit control and synchronization between the start and finish of a determined radial distance or thickness of the coiled strip on the reel, and the starting and stopping of the revolution counting means. Modified forms of such control are shown, in one of which the circuit contacts are stationary, the actuation for the contacts being effected by suitable mechanical means. In another modified form at least one of the contactors is bodily movable, the other cooperating contactor or conductor being stationary and of a length related or coordinated with a determined radial distance corresponding to the extent or radial distance of strip coiled upon the reel, corresponding to a period of time during which the number of revolutions of the reel are determined.

In the drawings showing a preferred selected embodiment together with certain modifications:

Fig. 1 is a general schematic and diagrammatic view indicating the relation between the rolls on a rolling mill through which the strip has passed, and from which it passes to the gaging wheels of a flying micrometer, and onto a winding reel, there being also shown a photo-electric means of control for the synchronous torque unit controlling the revolution counter and also a simplified schematic wiring diagram of the connections;

Fig. 2 is an enlarged fragment of a portion of Fig. 1, showing more clearly the relation between a fragment of the strip shown in section, and the gaging or feeler wheels of the flying micrometer; the indicating dial face of the flying micrometer is omitted, the same being shown, however, in Fig. 1;

Fig. 3 is a wiring diagram showing more clearly the electrical connections and means of control where a plurality of photo-electric beams are employed as the means of control;

Figure 9:
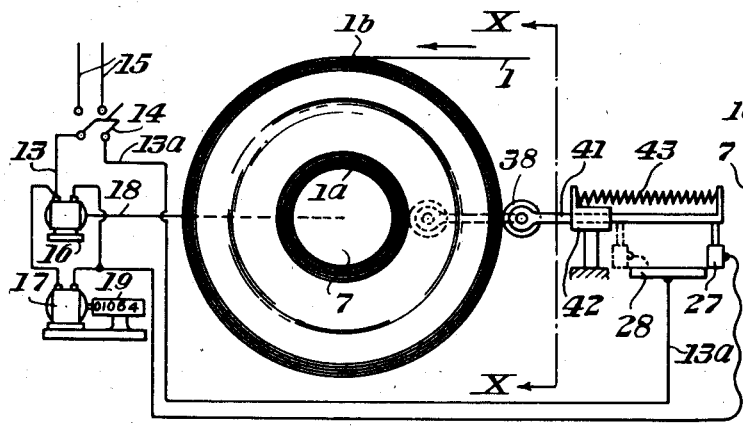
Figure 10:
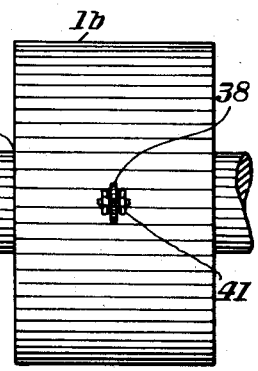
Figure 11:
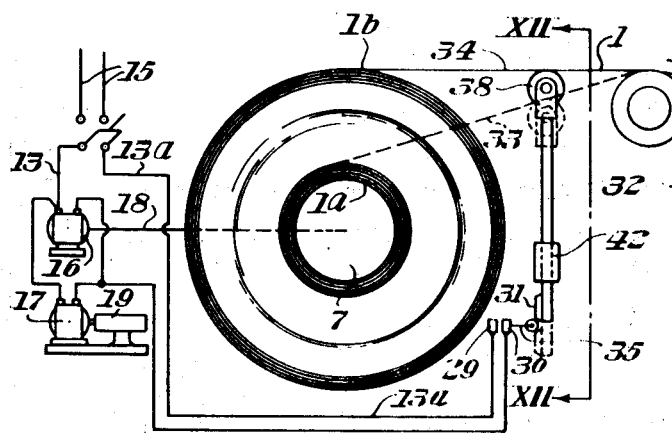
Figure 12:
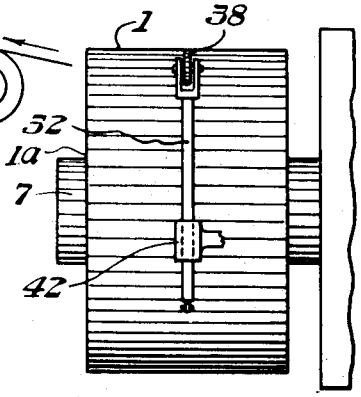

Fig. 4 is an end elevation of the reel with the strip material coiled thereon of Fig. 3, and shows more clearly the preferred arrangement of the source of light for the light beam, and the photo-electric cell, so as to extend diagonally across the coiled strip material, the light source and photo cell being disposed at opposite sides of the coil to minimize danger or injury in the event that the strip material is broken or severed for any reason;

Fig. 5 is a diagrammatic and fragmentary view in side elevation with respect to the strip material being coiled on the reel, and indicates a modified form of control in which a mechanical feeler arm is disposed centrally of the width of the strip material coiled on the reel, the modification being one in which one contact is movable, and another cooperating contactor or conductor is stationary and of a length coordinated with and determined by the particular radial thickness or extent of the coiled strip material on the reel during which the revolution counter is functioned;

Fig. 6 is a fragment of Fig. 5 showing the winding reel and strip material coiled thereon in end elevation;

Fig. 7 is a schematic straight wiring diagram indicating one circuit arrangement for effecting automatic sequential operation to effect proper synchronization of the starting and stopping of the counting means with the beginning and ending of a determinable radial thickness of coiled strip on the reel, where the photo-electric cell is employed to obtain automatic operation;

Fig. 8 is a schematic straight wiring diagram somewhat similar to Fig. 7 in some respects, but yet having a modified circuit arrangement which makes more positive a sequence of operations, in which it makes it impossible to start the revolution counting means until the coiled strip has been wound upon the reel to a point at which a surface of each strip will intercept one of the photo-electric beams, which position would correspond to the beginning of the radial distance through which the strip material is being wound upon the reel, and during which revolutions are being counted. Some portions of the schematic wiring diagram in Fig. 8 have been omitted which are the same as those shown in Fig. 7, including generally the photo-electric cells, the electronic tubes and amplifier adjusting elements, together with the telephone relays;

Fig. 9 is a diagrammatic view showing a modified form of control in which the feeler arm controlling the circuit is shown as a radially movable sliding arm, carrying one movable contact therewith, as contrasted with a pivoted and weighted arm arrangement, such as shown in Fig. 5;

Fig. 10 is an end elevation of the coiled strip material shown in Fig. 9, the view being taken on the line and looking in the direction of the arrows X—X of Fig. 9;

Fig. 11 is a diagrammatic view of a modified form in which the circuit control feeler arm is so arranged and disposed as to have its movement controlled by the relative position or angle of the strip material as it passes from a guide roll to the reel on which the strip material is wound, the angular position of the strip being fed to the reel, varying with the different radial thicknesses of the strip material on the reel;

Fig. 12 is an end view taken on the line and looking in the direction of the arrows XII—XII of Fig. 11 and shows the wheel of the control feeler arm disposed centrally of the strip.

Referring to Fig. 1, a strip 1 is shown in its path of travel upon leaving a pair of rolls 2 between which it has passed, either for a reducing, finishing or other type of operation in rolling mill. The arrangement of the rolls may be similar to those conventionally used in cold rolling strip material, though insofar as the method and means of determining the average thickness of a continuously moving strip throughout its width is concerned, the subject matter of the invention may have use and application independent of the particular character and type of rolling means. The rolls 2 are shown in their conventional relation with the usual backing rolls 3. After passing from between the processing rolls 2, one edge of the strip 1 is shown passing between the gaging or feeler wheels 5 of a flying micrometer, designated generally as 4, such micrometer being one of conventional type which is employed in detecting or gaging variations in thickness of a continuously traveling strip at one particular portion of the width of the strip, adjacent the edge thereof. An instrument of this type designated generally as a flying micrometer is provided with an indicating meter including a movable dial traveling over a graduated scale which, if desired, may be calibrated and related to the variations in thickness of the strip at the particular point which is gaged by the wheels 5 or other similar means arranged on opposite sides of the strip 1. Such an instrument is electromagnetically actuated and depends upon the potentiometer principle in which any variation in movement of the feeler arms 5 causes a change in resistance and a corresponding change in potential or voltage which is registered or indicated by the meter 6. The meter may be portable and arranged at any suitable or convenient position for observation and may be connected with the main body portion 4 by suitable leads or conductors 7. At this point it might be again noted that one of the practical difficulties in the use and application of such a flying micrometer in attempting to obtain an accurate indication of the true thickness of the traveling strip is that it is so sensitive that any slight variation in the travel of the moving strip from a given horizontal plane (caused by reasons other than an actual variation in the thickness of the strip of material, such for example as by vibration or flutter of the strip, which is sometimes encountered during the high speed of the strip) would cause a corresponding change or indication of the dial of the meter, which, of course, would not be a true and accurate reflection of a variation in the thickness of the strip, even at the particular limited portion of the strip width adjacent its edge. A position last indicated with the gaging or feeling wheels 5 on opposite sides of the strip adjacent the edge of the strip 1 is indicated in the fragmentary view showing the strip 1 in section as shown in Fig. 2.

Even though the dial indication of the flying micrometer is not altogether accurate, the judgment and experience of the operator enables fairly satisfactory results to be obtained in setting the rolls as to parallelism of the axis thereof, and the pressures required to obtain a strip of a thickness which will produce a package weight of the final coiled strip within the permissible tolerances of weight allowed in considering either the individual coiled strip tolerances, which may be at times within plus or minus 4 per cent or within carload tolerances which may be as low as 2 per cent when judged on the basis of carload lots. Of course, where reliance is placed upon the flying micrometer for ascertaining the thickness of the strip, which is the most satisfactory means now available and known to the art in practical operation, it is clear from the above that the individual judgment of the operator is a variable factor which enters into the solution of this problem. In accordance with the present invention, such variable judgment of the individual operator is eliminated in arriving at a determination of the true average thickness of the strip, not only at one limited portion of the width but throughout the entire extent of the width of the strip.

Referring further to Fig. 1, at the beginning of the winding or coiling of the strip 1 upon a coiling means, such as a core or reel 7 or the like, the leading end of the strip 1 must of course be suitably secured or carried about the core of the reel 7 a sufficient number of times in order to firmly secure the same in position. The reel or core 7 may be positively driven or rotated in a conventional manner by a suitable means not herein shown. One of the problems involved in obtaining a determination of the average strip thickness throughout its entire width, while the strip is continuously movable, is to obtain a sequence of operations, preferably in an automatic manner so as not to be dependent upon a possible error due to the skill or judgment of the operator. This preferably is effected in such a manner that a revolution counting means may be accurately synchronized and co-related with the beginning and ending of a radial distance or thickness of the strip material when coiled upon the rotating core or reel 7. Under such conditions the counting or revolution indicating means will be started and stopped at points corresponding with the beginning and ending of what preferably will usually be a determined and given radial distance. As herein disclosed, the beginning and ending of such a determinable radial distance, corresponding to an accurately determined number of revolutions, (which number in turn will correspond to the number of thicknesses of the coiled strip within such radial distance) will be at points intermediate of the actual beginning and ending of the coiled strip. However, it may be, under certain conditions and circumstances, that the beginning and ending of the radial distance of the thickness of the coiled material may correspond also with the beginning and ending of the coiled strip upon the reel. Under such conditions, of course, the number of revolutions indicated will correspond to the number of thicknesses of the coiled material on the reel.

Further referring to Fig. 1, there is shown a plurality of photo-electric beams 8 and 9 respectively, the beams being spaced apart a distance equal to any desired determined or determinable distance corresponding to the beginning and ending of a radial zone of the strip material coiled upon the rotatable core or reel 7. Preferably, the beginning and ending of the radial zone is disposed intermediate the beginning of the strip where it is at first secured to the reel, as at 1a, and the end of the coiled strip, such for example as at 1b. The beam 8 is provided by a source of light A which may be any one of a number of the commercially available tubes, such for example as number 1134. The light source may be provided with the usual slit and is projected across the winding reel so that when the strip has been coiled upon the reel to a point corresponding with the beginning of the given radial distance or zone, the light beam will be intercepted and cut off from the photo-electric cell T2 disposed on the opposite side of the winding reel.

A second source of light B which may be substantially similar to source of light A is also shown and provides a beam 9 which, as above noted, is spaced from the beam 8 a distance corresponding to the ending of the given or determined radial zone or extent of the coiled strip material. When the strip material has been coiled upon the reel for a sufficient number of turns, corresponding to the number of thicknesses of the strip material that have been built up within the determined zone, and to the end thereof, the light beam 9 will then be intercepted and cut off from the photo-electric cell T4. A definite sequence of operations caused by the successive cutting off of the light beams 8 and 9, by the surface of the coiled strip at the beginning and ending of the radial zone, is utilized to effect electro-magnetic control of a revolution counting means, so as to synchronize the starting and stopping of the counting means, automatically with the beginning and ending of the radial zone, without the necessity of the employment of the judgment or skill of the operator. A preferred form together with a number of modified forms of the automatic control means will hereinafter more fully be referred to.

In considering Fig. 2, it might be generally stated that the control means preferred are of the electro-magnetic type, employing a plurality of synchronous torque units, such as are characteristic of the Selsyn type of synchronous speed and torque control. A characteristic of such a system of control is that a synchronous driving speed relation may be effected between a driving and a driven member without the employment of any complicated mechanical clutching connections. Such a system readily adapts itself to an automatic electro-magnetic system of control.

As shown in Fig. 1, preferably a transformer is employed as a means of providing a suitable potential for light source A and B. As shown, the primary of the transformer 12 may be connected to the line conductors 13, 13a. The secondary winding of the transformer may be connected by suitable conductors 10, 10 to the filament of the light source A, B, which are connected in parallel.

A suitable switch 14 may be interposed between the conductors 13, 13a and the main line power terminals 15. Such switch 14 may be closed or opened as desired, either to initiate or discontinue the automatic system of control.

As shown in Fig. 1, the electro-magnetic control is shown as comprising two Selsyn units 16 and 17, the unit 16 being permanently mechanically connected as indicated by line 18, to the rotatable core or reel 7 upon which the strip material is coiled. The second unit 17 of the Selsyn synchronous torque type of control is shown mechanically permanently connected to the revolution counting means 19. There is no direct mechanical connection between the two units of the Selsyn synchronous torque type of control, the only connection between the two units being those of an electrical nature, so that when energized and subjected to the line potential, the two units are so arranged and connected that the torque and speed of one unit, such for example as the unit 16 which is mechanically driven from and by the winding reel 7, will be transmitted to the second unit 17, so that the speed of the second unit 17 will be substantially synchronous with the speed of the first unit 16. The energization of the Selsyn unit is subject to suitable control through contacts, for either establishing or breaking the circuit of the electro-magnetic units across the line. Various means for effecting a control of the contacts in the circuit of the electro-magnetic unit, such as the Selsyn synchronous torque unit, may be employed. Such control circuits are not shown in detail in Fig. 1, but where the photo-electric cell is used, as indicated in Fig. 1, the control mechanism including the amplifying means, electronic tubes and the various relays and control contacts, are generally indicated as contained within the control box 20. The detail control circuits to be employed in connection with the photo-electric system of control will hereinafter more fully be considered in connection with Figs. 7 and 8.

Other modified control systems will hereinafter be referred to in which the photo-electric system of control is employed for effecting the proper sequence of operations, and for effecting the closing and opening of the main control contacts which cause the energization and de-energization of the electro-magnetic control unit.

Other modified forms are shown in Figs. 5, 6, 9, 10, 11 and 12. In general, it might be stated that in the latter modified forms of control, the control of the electro-magnetic unit is effected through various arrangements of a mechanical feeler arm whose position is suitably disposed with reference to the outer face of the coiled strip at the beginning and ending of the radial zone of determined extent on the coil of the strip material. The movement of such feeler arm is co- related with contacts or with mechanical cam elements, suitably arranged so that the control contacts for the electro-magnetic unit are completed and opened in proper sequence, the circuit being closed for a period of time corresponding to that during which the strip material is being coiled throughout the extent of the determined radial zone.

The wiring diagram for the control means, employing the photo-electric cell control for the contacts, which contacts in turn control the electro-magnetic synchronizing units, is shown in greater detail in Figs. 3, 7 and 8. The control circuits shown in Fig. 3 are substantially identical to those shown in Fig. 7, excepting that in Fig. 7 the switch contacts M—1 and M—2 in the circuit in each of the Selsyn units designated as Sel. No. 1 Fld. and Sel. No. 2 Fld., are shown in the separate circuits for each of the Selsyn units, whereas in Fig. 3 the Selsyn units 16 and 17 are shown connected in parallel, and the circuit therefore is carried through a single pair of contacts designated as M—C1. The circuit is completed across the main line conductors 13, 13a for the energization of the Selsyn units through said single pair of contactors M—C1, instead of said circuit being completed through the two separate pairs of contacts M—1 and M—2, as above referred to and as shown in Fig. 7. Insofar as the energization of the Selsyn motor units is concerned from the main line source of power, the result and effect will be the same in either case.

As shown in Fig. 3, the light beams 8, 9, and the Selsyn units 16 and 17 are shown in a diagrammatic manner in their proper relation to the coiled strip material on the winding reel 7 and also with reference to the revolution counting means 19.

As heretofore noted, the proper functioning of a control means for the revolution counting means should be one in which the starting and stopping of the counting means should be synchronized with the beginning and ending of the determined radial zone, represented by the radial distance between the two light beams 8, 9. To accomplish this function, the automatic control system should be so arranged and controlled as to sequence of operations that the pair of contacts M—C1 in Fig. 3 or contacts M—1 and M—2 in Fig. 7 will be automatically closed simultaneously with the beginning of the determined radial distance. Such a condition would exist at the instance that the face of the strip 1 being coiled upon the reel 7 intercepts or is coincident with the beam 8. Under such conditions the flow of current through the photo-electric cell T2, which current flow is due to the effect of the light ray 8 upon the photo-electric cell 2, would be interrupted, and the balance of the current flow through the amplifying electronic tube T1 would be altered, so that the flow of current from the plate circuit of the electronic tube T1, through the telephone relay TR having the condensers C—2 connect in parallel therewith, would be interrupted. The telephone relay TR controls a single pair of contacts, as shown in Figs. 3 and 7, these contacts being designated as TR—C and are shown in circuit with a relay winding designated as M. The single pair of contacts TR—C controlled by the telephone relay TR are a normally closed pair of contacts. By a normally closed pair of contacts is meant a condition under which, when the telephone relay is de-energized, the contacts TR—C are in closed position or are in contact with each other. This is indicated in a conventional diagrammatic manner by the diagonal line connecting the two vertical lines representing the pair of contacts. It might be noted at this point that, as shown in the modified form of circuit arrangement as indicated in Fig. 8, the telephone relay TR controls two pairs of contacts, one of which TR—C is normally closed, and the other pair TR—C1 being normally open, and being closed only when the telephone relay TR is energized. Other differences in the circuit arrangement as modified in Fig. 8 will hereinafter be noted.

Reverting again to the circuit arrangement of Figs. 3 and 7, the normally closed pair of contacts TR—C was stated to be in the circuit with the relay winding M. The relay M as shown in Fig. 3 controls two pairs of contacts, identified as M—C1, which are in the common wire which supplies the Selsyn units 16 and 17 with current from the line 13, 13a, and also the pair of normally open contacts M—C2, which is shown connected in shunt or parallel relation with the normally closed pair of contacts TR—C. The normally open pair of contacts M—C2 might be designated as a pair of self-holding contacts in a functioning relation with respect to the relay winding M, because once the circuit for the relay M has been established or completed through the pair of normally closed contacts TR—C, which are in series with the normally open pair of contacts M1—C, such energization of the relay M closes the normally open contacts M—C2 and holds them closed and the circuit for the relay winding M may then be completed across the line through the pair of contacts M1—C, even though the normally closed pair of contacts TR—C may be open.

The normally open pair of contacts M1—C above referred to are controlled by the relay winding M1, and said relay winding M1 is controlled by a pair of normally open contacts TR1—C, which are connected in series with the relay winding M directly across the line wires 13, 13a. The normally open contacts TR1—C are in turn controlled by the telephone relay winding TR1, shown connected in shunt with the condenser C1, said shunt circuit comprising the telephone relay TR1 and the condenser C1, being connected with the plate P3 of the plate circuit of the electronic amplifying tube T3. The grid G3 of the electronic amplifying tube T3 is connected with the photo-electric cell T4, which receives the light beam 9 from the light source B, the said light beam 9 being coincident with the ending of the determined radial distance, so that when the surface of the coiled strip on the reel is wound upon the reel a sufficient distance or thickness so as to be coincident with the ending of the radial zone and to intercept the light beam 9, the balance of the current through the electronic tube T3 will be disturbed, and the relay TR1 will be de-energized and will permit the contacts TR1—C controlled thereby to be opened. The interruption of the circuit for the relay coil M1 by the opening of the pair of contacts TR1—C will in turn interrupt the circuit or the relay M by permitting the contacts M1—C to open. Upon the interruption of this last circuit permitting relay M to be de-energized, the contacts M—C1 in Fig. 3, which is in the circuit for the Selsyn control units, will be opened and such units will be de-energized and interrupt the driving relation between the rotating reel and the revolution counting device. In this manner the revolution counter will be stopped substantially coincident with the interruption of the beam 9 by the coiled strip when it reaches the ending of the radial zone. Referring to Fig. 7, the interruption of the circuit of the relay end by the opening of the contacts M1—C causes the three pairs of contacts M—1, M—2 and M—3 to open. The first two pairs of contacts, namely M—1 and M—2, are in the two Selsyn field circuits respectively so that the Selsyn electro-magnetic coupling means are de-energized and a driving relation between the rotating reel and the revolution counter is broken. As shown in Fig. 7, the pair of contacts M—3 serve as self-holding contacts to maintain the circuit for the relay M closed through the pair of contacts M1—C. The pair of contacts M—3 are referred to as self-holding contacts because such contacts are retained in closed position by the relay M, so long as the circuit for such relay is uninterrupted. The circuit for the relay M is initially completed by the closing of the pair of contacts TR—C which are controlled by the telephone relay TR which is connected to the plate of the electronic tube T1. As before indicated, the pair of contacts TR—C are normally closed contacts so that such contacts will be open so long as the light beam 8 is continuous and uninterrupted, under which conditions the telephone relay TR will be energized, thus holding the contacts TR—C in an open position. Upon interruption of the light beam 8 at the beginning of the radial distance or zone at the point where the surface of the strip material becomes coincident with such point, the telephone relay TR will be de-energized permitting the contacts TR—C to assume their normally closed position, and thus complete the circuit for the relay M through the normally open pair of contacts M1—C, which of course would be closed because of the completion of the circuit for the relay M1 through the pair of contacts TR1—C. After the completion of the circuit for the relay M through the pair of self-holding contacts M—3, it would be immaterial whether thereafter the pair of contacts TR—C, connected in shunt relation with the pair of contacts M—3, were either closed or open. As to the sequence of operations in the initial actuation of the two pairs of contacts, namely TR—C and M1—C, which are controlled by the respective light beams 9 and 8, it is highly desirable for accurate operation that the pair of contacts TR—C controlled by the light beam 8 should be opened before the pair of contacts M1—C are closed. The initial control is such that the pair of contacts TR—C are opened when the light beam 8 is continuous and uninterrupted, because under such conditions the relay TR would be energized and would open the normally closed pair of contacts TR—C. Such a desired sequence precludes any possibility of the Selsyn electro-magnetic coupling control units from being energized to cause the revolution counter 19 to be driven at any point before the beginning of the radial zone, such as at the instance that the face of the coiled strip intercepts the light beam 8.

The fragment of the wiring diagram shown in Fig. 8 shows a circuit arrangement in which there is such an interlock established between the circuit arrangements so as to make it impossible for the electro-magnetic coupling unit, such as the Selsyn units 16, 17 to be energized until the definite sequence has occurred as above indicated. Referring to Fig. 8, this will be illustrated by noting that it is impossible to complete the circuit through the relay M, through the normally closed pair of contacts TR—C and the normally open pair of contacts MI—C until the circuit has been completed through the relay MI, through a normally open pair of contacts TR—CI, which are controlled by the telephone relay TR, the control being of such a nature that the normally open pair of contacts TR—CI are closed only during the period when the telephone relay TR is energized. The pair of normally open contacts TR—CI have been added in Fig. 8 as compared with the circuit arrangement of Fig. 7. As a matter of fact, the normally closed pair of contacts TR—C might be referred to as a pair of back contacts for the pair of contacts TR—CI because both of such pairs of contacts are controlled by the telephone relay TR. Still referring to Fig. 8, a pair of normally open contacts MI—C2 are connected in parallel with the normally open pair of contacts TR—CI. The pair of contacts MI—C2 are closed when the circuit for the relay MI is initially completed through the closing of contacts TR—CI and TRI—C. The pair of normally open contacts TRI—C as heretofore noted are closed when the telephone relay TRI is caused to be energized by the impingement of the light beam 9 upon the photo-electric cell T4. It is clear therefore that the normally open pair of contacts MI—C2 are in the nature of self-holding contacts with respect to the relay MI. After the relay MI has been energized, and the circuit therefor completed through the pair of self-holding contacts MI—C2 and the pair of contacts TRI—C, it is immaterial whether or not the pair of contacts TR—CI are open or closed. However, in the normal operation, said contacts TR—CI will assume their normally opened position when the coiled strip interrupts the light beam 8 at the beginning of the radial zone, which will correspond to the period in which the revolution counting means will begin to register. Such an arrangement insures the proper sequence and eliminates possible chance for error, and renders the entire operation automatic without the necessity for intervention of the judgment or manual skill of the operator in effecting the synchronization of the beginning and ending of the radial zone with the starting and stopping of the revolution counting means.

Referring to Figs. 3 and 7, one of the well known and conventional types of amplifying circuit arrangements for the respective electronic tubes TI and T3 may be employed. As shown, the filament F3 of the electronic tube T3 is shown connected in circuit with resistances R4 and R5 of suitable value arranged on opposite sides of the filament and across the line, in a manner well known to those skilled in that particular art. Suitable adjustments of the potential of the grid G3 of the electronic tube T3 and also in relation to the photo-electric cell T4 and the adjustment thereof may be effected by suitable potentiometer adjustment provided in the usual manner by the resistance R6, having one end thereof carried to R4 and being adjustably connected in relation thereto. One terminal of the photo-electric cell T4 is shown adjustably connected in relation to the unit R—5. The grid G3 is shown connected by the conductor 23 to conductor 24 which in turn connects one side of the photo-electric cell and the unit R6. The conductor 25 identifies the adjustable connection between the other side of the photo-electric cell T4, and the resistance unit R5. The conductor 26 connects one side of the unit R6 and the unit R4, such connection being adjustable on various points of the resistance unit R4 so as to vary the relative potential relations in the various circuits. A similar circuit arrangement is provided in connection with the electronic tube TI, the photo-electric cell T2, and the units RI, R2 and R3, as shown in Figs. 3 and 7. It is not deemed necessary to repeat in detail the circuit arrangement inasmuch as such circuit arrangement is similar to that which has already been referred to in detail in connection with electronic tube T3 and photo-electric cell T4.

Figs. 5, 6, 9, 10, 11 and 12 show modified forms of control in which synchronization of the starting and stopping of the revolution counting means with the beginning and ending of the radial zone respectively is effected through a control means for the electro-magnetic clutching means of a type other than the photo-electric control. Stated generally, the synchronization and proper sequence of control is effected by a feeler arm which engages the outer face of the strip of material as it is coiled upon the reel and a suitable arrangement of contacts is made whereby the energizing circuit for the electro-magnetic coupling means is completed, and maintained for a suitable period and is finally interrupted at the proper point so that the making and breaking of such energizing circuit will be coincident with and synchronized with the beginning and ending of the radial zone or distance corresponding with a determined thickness of the coil during which the revolutions of the reel have been accurately determined. This characteristic is common to the three modified forms shown in Figs. 5, 9 and 11, respectively.

In general terms the form shown in Figs. 5 and 9 might be characterized as one in which one of the contacts designated as 27 is movable and the other contact 28 is stationary. The extent or length of the stationary contact 28 is arranged so as to correspond with the beginning and ending of the radial zone during which the revolution counter is in operation.

Fig. 11 shows a modified form in which the pair of contacts 29 and 30 are fixed at one particular station, there being permitted relative movement therebetween merely sufficient to open and close the circuit. The synchronization of the beginning and ending of the radial zone and the closing and opening of the contacts is effected through a cam member 31 movable with the arm 32 between the two limiting positions 33 of the strip and position 34 of the strip as it is guided on the winding reel. The different angular disposition of the strips shown in positions 33 and 34 would correspond to the beginning and ending of the radial zone. At any point between the beginning and ending of such zone a member 35 of any suitable character, such as a finger and wheel or roller, would ride upon the top face of the cam 31 and maintain the contacts 29 and 30 in closed position throughout the extent of the radial zone during which the strip is being coiled on the reel, and during which period the revolutions are being counted. From a practical standpoint, an arrangement in which the pair of contacts might be housed at one particular station may be of advantage from an electrical standpoint, particularly around rolling mills or other places where there likely may be fine metallic dust in the air. If any substantial portion of a conductor or contacting surface is exposed to the atmosphere, the fine metallic dust or the like may accumulate on the contacting surfaces and either form a poor contact, or possibly form a ground contact or short circuit.

As indicated diagrammatically in Fig. 5, a feeler arm 36 is shown pivoted at one end in a suitable support 37, and a feeler wheel or roller 38 is carried at one end and is adapted to contact with or ride upon the outer face of the strip of material which is coiled on the reel. The arm 36 may be suitably balanced by a counterweight 39 at the end of the arm 40. Any suitable constructions and arrangements may be provided whereby the contact 27 may be mounted to move with the arm 40, or correspond with the movement of the arm 36 which is the member which carries the feeler wheel 38, which determines the beginning and ending of the particular radial zone. As before indicated, the contact 28 is stationary and is adjusted to the proper length to correspond with the extent of the radial zone. It is understood of course that various arrangements and modifications may be made in detail. As more clearly indicated in Fig. 6, the arm 36 is preferably disposed so that the feeler wheel will be guided over the central portion of the width of the strip as it is rolled on the reel.

Fig. 9 diagrammatically illustrates a modified form which in general is similar to Fig. 5, excepting that a movable arm 41 carries the movable contact 27 radially of the reel in a suitable guide 42. A feeler wheel or roller 38 may be provided at the end of the arm 41 in a manner similar to that shown and described in connection with Fig. 5. A suitable spring 43 may be interposed by the support 42 and the arm 41 to maintain the wheel or roller in contact with the outer surface of the strip coiled on the reel. As shown in Fig. 10, the arm 41 and wheel feeler member 38 is disposed centrally of the width of strip material as it is coiled on the reel.

It is not deemed necessary to describe in any further detail the circuit arrangement in connection with Figs. 5, 9 and 11 because insofar as the energizing circuit for the Selsyn control units such circuits are substantially the same as those heretofore considered in referring to Fig. 3, wherein the energizing circuit for the electromagnetic coupling unit is controlled through the contacts M—C1.

While one preferred form and certain modifications have been shown and described herein, various changes in detail and arrangement of parts to meet varying conditions and circumstances as applied in the different applications may be made without varying from the spirit and scope of the present invention as defined in the following claims.

We claim:

1. In reeling apparatus in which strip material is coiled upon a reel, means for determining the average thickness of the continuously moving strip material throughout the width of the material while the strip material is being coiled on said reel, said means including a rotatable reeling means on which the strip material is wound or coiled, a radial reel zone of predetermined extent, a counting means cooperating with said reeling means during the reeling operation for determining the number of revolutions of the reel corresponding with said predetermined radial thickness of the coiled strip defined by the entry and exit of the outer face of the coiled strip on the reel, into the beginning and ending respectively of said determined radial zone, the beginning and ending of said radial zone being intermediate the beginning and ending of said entire length of continuous strip as coiled on said reel, and synchronous control means for the counting means, said synchronous control means including an actuating member driven in synchronous relation with said reel, and another member actuated thereby, whereby a synchronous actuating relation between said reel and said counting means may be effected without mechanical clutching connections being interposed between the rotatable coil winding reel, and the revolution counter, and automatic control means for synchronizing the starting and stopping of the effectiveness of said synchronous control means for the counting mechanism during the reeling operation simultaneously with the beginning and ending respectively of said determined radial zone of coiled strip on the rotatable reel.

2. Means as defined in claim 1, said automatic control means including photo-electric control means, said last named means including a plurality of light beams, one of said beams being coincident with the strip surface at the beginning of said radial zone, and a second beam being so arranged and disposed as to be coincident with the strip surface at the ending of the radial zone, control interlock means for the synchronous control means between the revolution counter and the coiling reel, to insure the requisite sequence of operations to obtain synchronization of the energization and deenergization of the synchronous control means, with the beginning and ending of the determined radial zone, said control interlock means including cut-out means so arranged and disposed as to preclude energization of the synchronous control means for the revolution counter at any time before the beginning of the given radial zone.

3. Means as defined in claim 1, said automatic control means including photo-electric control means, said last named means including a plurality of light beams, one of said beams being coincident with the strip surface at the beginning of said radial zone, and a second beam being so arranged and disposed as to be coincident with the strip surface at the ending of the radial zone, control interlock means for the synchronous control means between the revolution counter, and the coiling reel, to insure the requisite sequence of operations to obtain synchronization of the energization and de-energization of the synchronous control means, with the beginning and ending of the determined radial zone, said control interlock means including cut-out means so arranged and disposed as to preclude energization of the synchronous control means for the revolution counter at any time before the beginning of the given radial zone, at the interception of the first light beam by the surface of the coiled strip at a point coincident with the beginning of the radial zone.

4. Means as defined in claim 1, said automatic control means including photo-electric control means, said last named means including a plurality of light beams, one of said beams being coincident with the strip surface at the beginning of said radial zone, and a second beam being so arranged and disposed as to be coincident with the strip surface at the ending of the radial zone, control interlock means for the synchronous control means between the revolution counter and the coiling reel, to insure the requisite sequence of operations to obtain synchronization of the energization and de-energization of the driving synchronous control means, with the beginning and ending of the determined radial zone, said control interlock means including cut-out means so arranged and disposed as to preclude energization of the synchronous control means for the revolution counter at any time before the coiling of the strip to a position corresponding with the beginning of the given radial zone, the interception of the first light beam by the surface of the coiled strip at a point coincident with the beginning of the radial zone, said cut-out means including a circuit for the synchronous control means including normally open contacts, a second circuit including a relay winding controlling said normally open contacts, said second circuit including a plurality of pairs of contacts connected in series with said relay winding, one pair of said contacts being controlled by the first light beam intercepted at the beginning of the radial zone, said pair of contacts being normally closed upon interception of said first light beam, a third circuit including a second relay winding controlling the second pair of contacts in said second circuit, said second pair of contacts in said second circuit being normally open and controlled by the second light beam disposed coincident with the ending of the radial zone, through and by means of said second relay winding, a pair of normally open contacts in said third circuit and in series with said second relay, said last named contacts being controlled by said second light beam so as to be closed when said second light beam is continuous and uninterrupted.

5. In a reeling operation in which strip material is coiled upon a reel, means for determining the average thickness of the continuously moving strip material throughout the width of the material while the strip material is being coiled on said reel, said means including a rotatable reeling means on which the strip material is wound or coiled, a radial reeling zone of determined extent, a counting means cooperating with said reeling means during the reeling operation for determining the number of revolutions of the reel corresponding with said predetermined radial thickness of the coiled strip defined by the entry and exist of the outer face of the coiled strip on the reel during the reeling operation, into the beginning and ending respectively of said determined radial zone, and synchronous control means for the counting means, said synchronous control means including an actuating member driven in synchronous relation with said reel, and another member actuated thereby, whereby a synchronous actuating relation between said reel and said counting means may be effected between the rotatable coil winding reel, and the revolution counter, and automatic control means for synchronizing the starting and stopping of the effectiveness of said synchronous control means for the counting mechanism during the reeling operation simultaneously with the beginning and ending respectively of said determined radial zone of coiled strip on the rotatable reel, said automatic control means including photoelectric control means, said last named means including a plurality of light beams, one of said beams being coincident with the strip surface at the beginning of said radial zone, and a second beam being so arranged and disposed as to be coincident with the strip surface at the ending of the radial zone, control interlock means for the synchronous control means between the revolution counter and the coiling reel, to insure the requisite sequence of operations to obtain synchronization of the energization and de-energization of the synchronous control means, with the beginning and ending of the determined radial zone, said control interlock means including cut-out means so arranged and disposed as to preclude energization of the synchronous control means for the revolution counter at any time before the beginning of the given radial zone, at the interception of the first light beam by the surface of the coiled strip at a point coincident with the beginning of the radial zone, said cut-out means including a circuit for the synchronous control means including normally open contacts, a second circuit including a relay winding controlling said normally open contacts, said second circuit including a plurality of pairs of contacts connected in series with said relay winding, one pair of said contacts being controlled by the first light beam intercepted at the beginning of the radial zone, said pair of contacts being normally closed upon interception of said first light beam, a third circuit including a second relay winding controlling the second pair of contacts in said second circuit, said second pair of contacts in said second circuit being normally open and controlled by the second light beam disposed coincident with the ending of the radial zone, through and by means of said second relay winding, a pair of normally open contacts in said third circuit and in series with said second relay, said last named contacts being controlled by said second light beam so as to be closed when said second light beam is continuous and uninterrupted, and sequence control interlock means in said third circuit to prevent completion of said third circuit until after the first light beam and the second light beam have been established, and to prevent completion of said second circuit until after said first light beam has been intercepted, at a point coincident with the beginning of the radial zone during the strip coiling operation.

6. Means as defined in claim 5, wherein said sequence control interlock means includes a pair of normally open beam controlled contacts connected in said third circuit in series with said second relay winding and said pair of normally open contacts in said third circuit, said pair of normally open sequence control contacts being controlled by said first light beam so as to close said pair of contacts when said first light beam is continuous and uninterrupted, and to open said contacts when said first light beam is interrupted coincident with the beginning of the radial zone, whereby said synchronizing control means for the revolution counter may be initially energized at the beginning of said radial zone.

7. Means as defined in claim 5, wherein said sequence control interlock means includes a pair of normally open beam controlled contacts connected in said third circuit in series with said second relay winding and said pair of normally open contacts in said third circuit, said pair of normally open sequence control contacts being controlled by said first light beam so as to close said pair of contacts when said first light beam is continuous and uninterrupted, and to open said contacts when said first light beam is interrupted coincident with the beginning of the radial zone, whereby said synchronous control means for the revolution counter may be initially energized at the beginning of said radial zone, said sequence control interlock means also comprising a normally open pair of self-holding contacts connected in shunt with said normally open beam controlled pair of contacts, and controlled by said second relay in said third circuit so as to retain said pair of self-holding contacts in a closed position, when said third circuit is initially completed through said two light beam controlled pairs of contacts, and also retained in closed position after said shunt connected pair of contacts have opened upon interception of said first light beam coincident with the beginning of said radial zone, whereby the continued energization of the electro-magnetic driving means for the revolution counting device is maintained until interruption of said energizing circuit coincident with the end of the radial zone.

8. In reeling apparatus in which strip material is coiled upon a reel, means for determining the average thickness of the continuously moving strip material throughout the width of the material while the strip material is being coiled on said reel, said means including a rotatable reeling means on which the strip material is wound or coiled, a radial reel zone of predetermined extent, a counting means cooperating with said reeling means during the reeling operation for determining the number of revolutions of the reel corresponding with said predetermined radial thickness of the coiled strip defined by the entry and exit of the outer face of the coiled strip on the reel, into the beginning and ending respectively of said determined radial zone, the beginning and ending of said radial zone being intermediate the beginning and ending of said entire length of continuous strip as coiled on said reel, and synchronous control means for the counting means, said synchronous control means including an actuating member driven in synchronous relation with said reel, and another member actuated thereby, whereby a synchronous actuating relation between said reel and said counting means may be effected without mechanical clutching connections being interposed between the rotatable coil winding reel, and the revolution counter, and automatic control means for synchronizing the starting and stopping of the effectiveness of said synchronous control means for the counting mechanism during the reeling operation simultaneously with the beginning and ending respectively of said determined radial zone of coiled strip on the rotatable reel, said automatic control means includes a plurality of contactors controlling the energizing circuit for said synchronizing control means, means controlling the opening and closing of said contacts, and the time period during which said contacts are in closed relation, said time period corresponding to the period required to coil the strip material on the reel, from the beginning to the ending of said determined radial distance or thickness of coiled strip material, said contact control means including a feeler arm so arranged and disposed with reference to the face of the strip material as it is coiled upon the winding reel as to reflect or indicate the beginning and ending of said radial zone, and means arranged and disposed between said feeler arm and one of said contacts to maintain an open circuit condition of said contacts before the face of the strip being coiled is coincident with the beginning of said radial zone, and means so disposed and arranged between the feeler arm and one of the stationary contacts as to maintain said contacts in closed position throughout the period during which the strip material is being coiled on the reel, from the beginning to the ending of the said radial zone, and so disposed and arranged as to open said contacts at the end of said radial zone.

9. Means as defined in claim 8 wherein said electro-magnetic means comprises Selsyn synchronous torque units.

10. In reeling mechanism, in which strip material is coiled upon a reel, means for determining the average thickness of the continuously moving strip material throughout the width of the material while the strip material is being coiled on said reel, said means including a rotatable reeling means on which the strip material is wound or coiled, a radially extending reeling zone of predetermined extent, a counting means for determining the number of revolutions of the reel, corresponding with said determined radial thickness of the coiled strip, defined by the entry and exist of the outer face of the coiled strip on the reel into the beginning and ending respectively of said determined radial zone, and electro-magnetic coupling means, comprising a plurality of synchronous torque units, of a Selsyn motor type, whereby a synchronous speed between a driving and driven member may be effected without mechanical clutching connections being interposed between the rotatable coil winding reel and the revolution counter, one of said Selsyn units being permanently mechanically connected with said rotatable coil winding reel as a driving member for said revolution counter, and the other of said Selsyn units being connected with the revolution counter as a driven member, and means sychronizing automatically the energizing and de-energizing of said Selsyn units between the rotating reel and the revolution counter, with the beginning and ending of the said radial zone.

11. In a reeling apparatus in which strip material is coiled upon a reel, means for determining the average thickness of the continuously moving strip material throughout the width of the material while the strip material is being coiled on said reel, said means including a rotatable reeling means on which the strip material is wound or coiled, a radial reel zone of predetermined extent, a counting means cooperating with said reeling means during the reeling operation for determining the number of revolutions of the reel corresponding with said predetermined radial thickness of the coiled strip defined by the entry and exit of the outer face of the coiled strip on the reel, into the beginning and ending respectively of said determined radial zone, and synchronous control means for the counting means, said synchronous control means including an actuating member driven in synchronous relation with said reel, and another member actuated thereby, whereby a synchronous actuating relation between said reel and said counting means may be effected between the rotatable coil winding reel, and the revolution counter, and automatic control means for synchronizing the starting and stopping of the effectiveness of said synchronous control means for the counting mechanism during the reeling operation simultaneously with the beginning and ending respectively of said determined radial zone of coiled strip on the rotatable reel, said automatic control means including photo-electric control means, said last named means including a plurality of light beams, one of said beams being coincident with the strip surface at the beginning of said radial zone, and a second beam being so arranged and disposed as to be coincident with the strip surface at the ending of the radial zone, control interlock means for the synchronous control means between the revolution counter and the coiling reel, to insure the requisite sequence of operations to obtain synchronization of the energization and de-energization of the synchronous control means, with the beginning and ending of the determined radial zone.

12. In rolling mill operation wherein continuous strip material is subjected to a coiling operation after one of the rolling operations in which a flying micrometer thickness sizing operation is employed for determining the gauge or thickness of the strip material after the rolling adjacent one edge portion of the strip, that method of determining the average thickness of the strip material throughout its entire width as a check upon the determination of thickness along one longitudinal zone of the material at one portion of the width of the strip, corresponding to a known number of turns for a known radial thickness of the material coiled, which method consists in coiling the strip material, establishing and utilizing during the operation a radial zone of predetermined extent, determining the number of turns of the coiled strip during the change of the coiling strip radius from one determined value to another corresponding to any given radial thickness of the material coiled, and determining the average thickness of each layer or turn of strip material throughout its width as coiled within said given radial portion by dividing the known or given radial thickness of the coiled strip material by the number of revolutions of the coiled strip to build up said radial thickness.

13. In rolling mill operation wherein continuous strip material is coiled after one of the rolling operations, that method of determining the average thickness of the strip material throughout its entire width for a predetermined length of the material corresponding to a known number of turns of the coiled material determined during the winding operation, for a known radial thickness of the coiled material, which method consists in coiling the strip material, establishing and utilizing during the coiling operation a radial zone of predetermined extent, determining the number of turns of the coiled material during the coiling operation corresponding to any given radial thickness of the coiled material, and determining the average thickness of each layer or turn of strip material throughout its width as coiled within the radially measured portion in accordance with the formula, $$Ta = \frac{Rt}{Nt}$$

in which $Ta$=average thickness throughout the entire width of the strip, $Rt$ is equal to the radial thickness of the coiled strip material for a predetermined number of revolutions of the coiled strip, and $Nt$ is equal to the number of revolutions of the coiled strip determined during the coiling operation required to build up a predetermined radial thickness of coiled strip.

14. In a rolling mill operation wherein continuous strip material is subjected to a coiling operation after one of the rolling operations, that method of determining the average thickness of a coiled strip throughout its width, said method consisting in the following steps, coiling the strip, establishing and utilizing during coiling operation the beginning and ending of a zone extending radially of the coiled strip, said radial zone being of predetermined extent and corresponding to a certain number of revolutions of the coiled strip, depending upon the thickness of the strip being coiled, and starting a counting of the number of revolutions of the coiled strip, simultaneously upon the entry of the surface of the coiled strip into the beginning of the radial zone of predetermined extent, without interfering with the continuity of the coiling operation and stopping the revolution counting simultaneously upon entry into, and registry of, the surface of the strip, coincident with the entry of the strip into the ending of the zone extending radially of the coiled strip.

15. A method as defined in claim 14, and including the steps of determining the number of revolutions of the coiled strip throughout a radial distance corresponding to that radial distance between the beginning and ending of said zone, and determining the average over all thickness throughout the entire width of the strip by obtaining the quotient resulting from dividing the distance between the start and finish of said radial zone by the number of revolutions of the coiled strip obtained through the change of the radial thickness of the called strip from the start to the finish of said radial zone.

HARRY A. DEUEL, Jr.
GEORGE H. KRAPF.